April 24, 1934. A. G. MONTGOMERY 1,956,395
HEAT RETAINER FOR FOOD SERVICE
Filed May 6, 1933
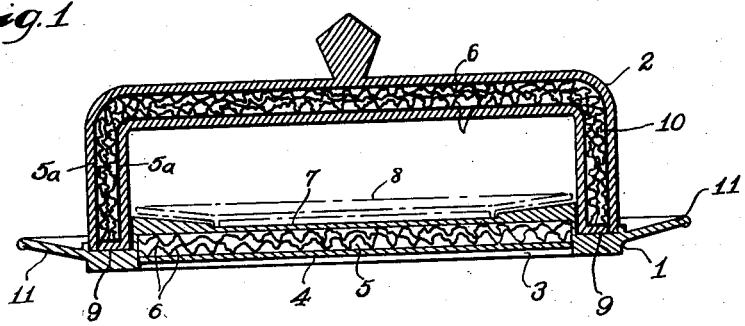
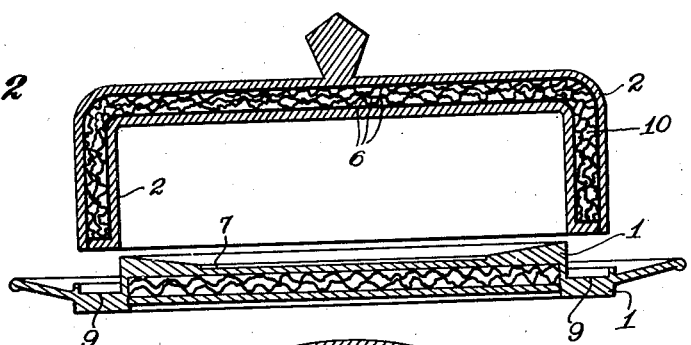
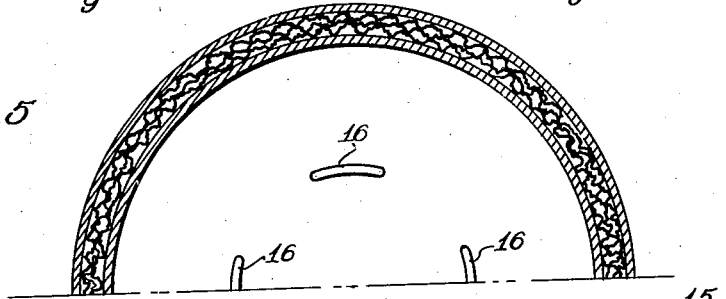
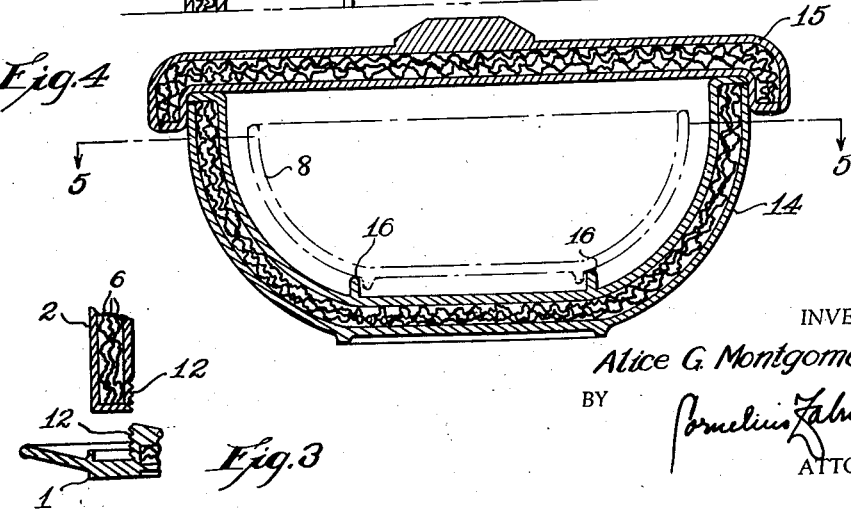
INVENTOR.
Alice G. Montgomery
BY
ATTORNEY.

Patented Apr. 24, 1934

1,956,395

UNITED STATES PATENT OFFICE 1,956,395

HEAT RETAINER FOR FOOD SERVICE

Alice G. Montgomery, New York, N. Y.

Application May 6, 1933, Serial No. 669,710

8 Claims. (Cl. 65—59)

This invention relates primarily to the art of serving foods and is directed more especially to a device which will serve to keep food contained in dishes, on platters or in bowls or the like in a warm, palatable condition for appreciable periods.

The invention while adapted for general application in this field is particularly useful in connection with room service in hotels, clubs and the like, where hot dishes are prepared in the kitchen or pantry and delivered to guests in rooms on trays and the like for consumption in the room. Food is generally served at present on large trays containing the various dishes used for the meal, some of which dishes are covered with inverted plates or the like to retain the heat or with napkins intended to serve the same purpose.

Experience has shown, however, that when food is carried through corridors and in elevators in this way that the heat is rapidly dissipated, so that the food, when placed before the guest, is cool and unpalatable. Attempts have been made to overcome this difficulty generally through the provision of porcelain, china or metallic covers, but experience has shown that these dissipate or radiate the heat from the food rapidly and are a wholly inadequate solution of the problem.

The object of the present invention is to provide an effective heat retainer which will be relatively light and not unduly cumbersome and which will effectually retain the food contained therein in a hot, palatable condition for prolonged periods.

The present invention depends for its operation upon the fundamental physical properties of certain materials to reflect heat rather than to absorb or radiate the same. Aluminum foil is one substance possessing this property. A coating of aluminum powder upon a paper or other suitable backing will serve a like purpose and there are other equivalent substances which will operate in the same manner.

Based on this phenomenon, the present invention embodies a jacketed container comprising a suitable base adapted to support or enclose a dish, platter, bowl or the like, and which base has associated therewith a removable cover adapted preferably to interfit with the base in a manner to produce a substantially tight or stepped joint therewith. Both the base and the cover are jacketed, i. e., they are formed with hollow walls and said jackets are preferably hermetically sealed to preclude the entrance of air or moisture into or out of the same. In these jackets are contained a plurality of layers of the reflecting material which, for the purposes of example, will be hereinafter referred to as aluminum foil.

The foil is made relatively thin and is so arranged that the successive layers thereof will not come into close face abutting relation throughout, but will, on the contrary, be spaced apart, so as to provide in effect a substantially laminated structure with interposed spaces. These spaces may contain air, gas or may be evacuated, so as to constitute a partial vacuum, although the latter is not essential. Furthermore, the layers of reflecting material may be arranged substantially parallel to one another and spaced apart in any appropriate way or they may be crumpled prior to positioning them within the jackets in such manner that the crumpling will space them apart through the greater portions of their extents and so that they will respectively engage one another in substantially point or fine line contacts of such character as will not materially transmit heat through conductivity.

The jacketed base and cover constitute collectively a casing in which the dish, platter, bowl or the like is adapted to be housed. The container is big enough, so that the dish or bowl will not contact with the container except at its bottom where appropriate means is provided to minimize this contact as much as possible, in order to preclude appreciable heat being conducted away from the wall of the disk or bowl to the wall of the casing. Thus, the dish is substantially free from contact with the casing throughout the greater portion of its extent and is spaced therefrom as much as possible.

Experience has shown that food housed in the manner described retains its heat and aroma through protracted periods.

Features of the invention, other than those adverted to, will be apparent from the hereinafter detailed description and claims, when read in conjunction with the accompanying drawing.

The accompanying drawing illustrates different practical embodiments of the invention, but the constructions shown therein are to be understood as illustrative, only, and not as defining the limits of the invention.

Figure 1 is a central vertical section through a device embodying the present invention as adapted more particularly for use in connection with plates, platters and the like. This view illustrates the casing closed with a dish positioned therein.

Figure 2 is a view similar to Figure 1 with the cover elevated from the base and the dish removed.

Figure 3 is a fragmental section showing a screw connection between the cover and the base.

Figure 4 is a central vertical section showing a casing of a form well adapted to house a bowl or deep dish.

Figure 5 is a section on the line 5—5 of Figure 4 with the bowl removed.

Referring to the drawing and more particularly to Figures 1 and 2, 1 designates a base portion and 2 a cover portion. The base and the cover may be made of widely varying shapes or in any appropriate size according to taste and design and to the particular type of dish or platter which it is desired to use in conjunction therewith.

As shown in Figures 1 and 2, the central portion of the base is made relatively deep to provide in the bottom thereof a recess 3 sealed by a circular disk 4 to provide a closed jacket 5. In practice, the base may be conveniently molded or stamped from any suitable material and may be either metallic or of some composition material, and after formation of this part, the reflecting material, designated generally by the reference character 6, is placed in the jacket 5 and the jacket thereupon closed and sealed by the plate 4 secured in place at its edges by any suitable form of cement, solder or in any other appropriate way, the essential feature being that the base is jacketed and provided with a reflecting material 6 presently to be described.

The central portion of the base is formed at its upper surface with an appropriate seat 7 on which a dish or other food receptacle 8 is adapted to rest. This upper surface is preferably provided with a central depression or with any other suitable centralizing means, the function of which is to centralize the plate 8 with respect to the base.

About the central portion of the base is formed an annular seat 9 for the cover 2 which, as illustrated in Figures 1 and 2, is made with inner and outer walls spaced apart and forming between them a jacket 10. The inner and outer walls may be made of the same or different material than the base and may be constructed separately and thereafter assembled and glued, soldered or otherwisely adhesively secured together. Furthermore, if desired the parts which form collectively the jacket for the cover or the parts which form collectively the jacket for the base may have a positive mechanical connection, such as by threading, sweating or otherwise, or may be assembled with a forced fit.

The base shown in Figures 1 and 2 is formed with a peripheral lip 11 to facilitate handling. In these figures, the cover and base are shown as having an interfitting connection with the joint formed between these parts changing direction a plurality of times to preclude the exit of heat through this joint and with the jackets of the two parts collectively enclosing the entire interior of the resulting container. The joint between these parts, however, may be otherwise than shown and instead of being a mere interfitting connection, the parts may be secured together with a screw connection, indicated at 12 in Figure 3 or this screw connection may be a bayonet joint or any other appropriate joint or means for locking the parts to one another against inadvertent displacement.

The container shown in Figures 4 and 5 comprises a jacketed base 14 and a jacketed cover 15 with centralizing lugs 16 formed in the base for the purpose of centralizing a food container 8. The inner and outer walls of the base and cover may be made separately and thereafter assembled in any of the several ways described in connection with Figures 1 and 2 to form the hollow jackets shown, and which jackets preferably overlap to entirely enclose the confines of the casing.

Of essential importance in the present invention is the heat radiating means to which I have hereinbefore referred. Heretofore it has been the practice where it was desired to preclude loss of heat through radiation to provide either partial vacuums in jackets or to pack jackets or surround articles in which heat was to be retained with cork, felt, hair and other fibrous or cellular substances with a view to insulating against radiation. All of these prior expedients are open to serious objections when used in connection with foods. They are unsanitary and unhygienic and provide innumerable spaces for the lodging of germs and other foreign matter. It is practically impossible to keep them clean. Furthermore, they add materially to the weight of any structure in which they are incorporated and aside from the foregoing are not efficient in the performance of their intended functions. Unless a very considerable thickness of these materials is employed, they are wholly inadequate for any useful purpose.

The present invention, in contradistinction, employs, in its preferred practical form, aluminum foil of a few ten thousandths of an inch in thickness. It is absolutely sanitary, will not absorb moisture and will keep clean and bright indefinitely. Its weight is almost infinitesimal as compared to the weight of packings and it differs from such other packings in the further very important particular, namely, that instead of absorbing and dissipating the heat, it serves on the contrary to radiate the heat back in the direction from whence it comes.

In utilizing aluminum foil in carrying out the present invention, I preferably use a plurality of sheets of this foil and arrange them in facial, spaced apart relation within the jackets, as shown in the several figures of the drawing. The spacing may be accomplished in any appropriate way. In practice, the sheets may be made smooth and flat, or curved to the shape of the jackets and they may be spaced apart with interposed spacers, metallic or otherwise, but, in the preferred form of this invention, I find it convenient and highly economical to crumple the sheets prior to positioning them within the jackets. In other words, the sheets are crumpled and then placed on one another in one member of each jacket and then the other relatively movable member is brought into position. This flattens out the sheet somewhat but does not bring them into facial engagement except at isolated points, as their crumpled facial surfaces serve to space the greater portions of the sheets from one another and provide in effect spaced apart reflecting surfaces with interposed spaces.

Thus when the two members or sections of each of the parts are brought together to assemble them, they serve to compress the crumpled foil between the walls of the respective sections and place it under sufficient compression to hold it firmly in position, but under insufficient compression to compact the foil into a solid mass. Thus the foil remains under slight compression with the successive sheets of the foil in contact with one another at isolated points.

I may use in these jackets any desired number of sheets of reflecting material and there may be more thicknesses in the cover jacket than in the base jacket or vice versa as may be desied. In any event, the mode of operation of this material in carrying out its functions is the same. Heat from the dish, bowl or platter 8 which penetrates the inner wall of the jacket and impinges the innermost sheet of reflecting material is reflected back in a large degree. A very small portion of the heat impinging this first sheet may, however, pass therethrough by conduction or otherwise, but a portion of this heat will be reflected back, and so on with respect to the several sheets. Each sheet functions to reflect back some of the heat so that all of them operate together and in the manner described preclude loss of heat through radiation to the outside.

In addition to the use of the sheets as described, which may in practice be loosely positioned within the respective jackets, the interior surfaces of the walls of the jackets may be provided thereon with coatings of reflecting material indicated in the drawing by the reference character 5a or for these coatings may be substituted foil adhesively secured to the walls of the jacket. Any suitable adhesive, such as a silica cement, may be employed for this purpose and this cement may be distributed broadcast over the foil or the attachment may be at spaced apart points as desired.

I call particular attention to the manner in which the food container 8 is positioned within the casing. As shown in the drawing, the container is so mounted as to be spaced from the wall of the casing and not have appreciable contact with the base portion. Thus, in Figure 1, the plate 8 is shown as resting upon the lower edge of the bottom flange with which such plates are ordinarily provided, leaving all other parts of the plate out of contact with the casing, so that there is in effect merely a fine line contact between these parts.

In the constructions of Figures 4 and 5, the base of the casing is provided with supporting lugs 16 which are relatively small and, while they serve to centralize the container 8, they have a relatively short line contact therewith. The advantage of this arrangement is that very little heat can be carried off from the container to the casing through conduction and consequently any heat which leaves the container or the food therein must do so by radiation and this heat is reflected back by the foil.

I may in practice make the casing parts from metal or from metal and/or other material, but I preferably form these elements of some composition material such as "bakelite", or the like, which has low heat conductivity and which is relatively light in weight. The resulting structure can be readily cleaned and is susceptible of such ornamentation or design as may be desired.

Experience has shown that when edibles are served in a dish or on a platter within a jacketed casing containing the heat reflecting material, as hereinbefore stated, the heat is retained for appreciable periods. The close fitting cover retains aroma and precludes drying of the food and even after a considerable time such food is found to be at the proper temperature and in pleasing, palatable condition.

It will of course be understood that the present invention may partake of a wide variety of designs and shapes and that the cover may be fitted to the base through any suitable form of joint which, however, is preferably such as to form substantially a seal against the exit of heat or vapors. In practice, I may employ any suitable form of fit between the cover and the base, such as an ordinary sliding fit or a tapered fit, and the cover may be locked to the base by threads or otherwise or may simply be held to the base by gravity. It will thus appear that the invention is susceptible to various modifications without departing from the spirit and scope of this invention as set forth in the appended claims.

I have hereinbefore referred to the invention as particularly adapted to keep food warm, i. e., to preclude loss of heat contained within the casing. This is the primary purpose of the present invention, although it may operate with efficiency to maintain cold articles in the casing against heating from the exterior thereof and the invention is to be understood as useful in this connection as well.

I have herinbefore described this invention as a casing for dishes or other containers for food, as best results are obtained when it is used in this way. If desired, however, the separate container may be dispensed with and the food placed directly in the casing.

Having thus fully described the invention, what I claim as new and desire to secure by Letters Patent is:

1. A heat retainer for food service embodying base and cover members adapted to interfit with one another to form a substantially sealed enclosure to contain dishes for food, each of said members being a double walled closed chamber comprising a plurality of interfitting sections permanently secured together with superimposed sheets of crumpled foil interposed between them under sufficient compression exerted by the respective sections to hold the several sheets of said foil in predetermined position against shifting with the successive sheets of the foil in contact with one another only at isolated points.

2. A heat retainer for food service embodying base and cover members adapted to interfit with one another to form a substantially sealed enclosure adapted to contain dishes for food, each of said members comprising a double walled closed chamber containing superimposed sheets of crumpled aluminum foil, the irregularities of which space the major portions of adjacent sheets from one another, each double walled chamber comprising a plurality of sections secured together by an air tight joint with the crumpled foil under sufficient compression between the walls of the respective sections to hold it in predetermined position with the successive sheets of the foil in contact with one another at isolated points, and the interiors of said double walled chambers being under a partial vacuum.

3. A heat retainer for food service embodying base and cover members adapted to interfit with one another to form a substantially sealed enclosure adapted to contain dishes for food, each of said members comprising a double walled closed chamber containing superimposed sheets of crumpled aluminum foil, the irregularities of which space the major portions of adjacent sheets from one another, each double walled chamber comprising a plurality of sections secured together with the crumpled foil under sufficient compression between the walls of the respective sections to hold it in predetermined position with the successive sheets of the foil in contact with one another at isolated points, and a sheet of uncrumpled foil adhesively secured to the interior of one of the walls of one of said double walled chambers.

4. A heat retainer for food service embodying base and cover members adapted to fit with respect to one another to form an enclosure for a container for foods, spaced apart lugs on the interior of said enclosure to support a container of food therein with limited physical contact between the container and enclosure, to minimize conduction of heat from the container to the enclosure, both the base member and cover member being formed with spaced apart double walls forming between them closed containers, and heat reflecting material positioned within each of said chambers to reflect such heat as may impinge thereon.

5. A heat retainer for food service embodying base and cover members adapted to interfit with one another to form a substantially sealed enclosure adapted to contain a receptacle for food, each of said members comprising a double walled closed chamber containing superimposed sheets of crumpled aluminum foil, the irregularities of which space the major portions of adjacent sheets from one another, each double walled chamber comprising a plurality of sections secured together with the crumpled foil under sufficient compression between the walls of the respective sections to hold it in predetermined position with the successive sheets of the foil in contact with one another at isolated points, and means on the upper face of the base member to engage with the bottom of a food receptacle resting on the upper face of said base member and space the periphery of said receptacle from the periphery of the base member.

6. A heat retainer for food service embodying base and cover members shaped to interfit with one another to form a substantially sealed enclosure adapted to contain dishes for food, each of said members comprising a double walled closed chamber containing superimposed spaced apart laminations of aluminum foil, said base member being provided with a raised portion extending into and fitting within the cover member and the upper surface of which raised portion is shaped to centralize a dish resting thereon to space the periphery of such dish from contact with the base member.

7. A heat retainer for food service embodying base and cover members shaped to interfit with one another to form a substantially sealed enclosure adapted to contain dishes for food, each of said members comprising a double walled closed chamber containing superimposed spaced apart laminations of aluminum foil, said base member being provided at its upper face with a channel to receive and house the lower edge of the cover member.

8. A heat retainer for food service embodying base and cover members shaped to interfit with one another to form a substantially sealed enclosure adapted to contain dishes for food, each of said members comprising a double walled closed chamber containing superimposed spaced apart laminations of aluminum foil, said base member being provided at its upper face with a channel to receive and house the lower edge of the cover members, said channel being of such depth that the closed chamber of the cover member will at least partially overlap the closed chamber of the base member.

ALICE G. MONTGOMERY.